US008565229B2

(12) United States Patent
Kasztenny (10) Patent No.: US 8,565,229 B2
(45) Date of Patent: Oct. 22, 2013

(54) SYSTEMS AND METHODS FOR DATA PACKET TRANSMISSION (75) Inventor: Bogdan Z. Kasztenny, Markham (CA)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 252 days.

(21) Appl. No.: 12/818,410

(22) Filed: Jun. 18, 2010

(65) Prior Publication Data

US 2011/0310893 A1  Dec. 22, 2011

(51) Int. Cl.
   *H04L 1/00* (2006.01)
(52) U.S. Cl.
   USPC ........... 370/389; 370/252; 370/392; 370/474; 370/477; 714/748; 714/752
(58) Field of Classification Search
   USPC .......... 370/389, 392, 252, 474–477; 714/748, 714/752
   See application file for complete search history.

(56) References Cited

U.S. PATENT DOCUMENTS

| | | | |
|---|---|---|---|
| 5,515,227 A | 5/1996 | Roberts et al. | |
| 5,793,750 A | 8/1998 | Schweitzer, III et al. | |
| 6,518,767 B1 | 2/2003 | Roberts et al. | |
| 6,590,397 B2 | 7/2003 | Roberts | |
| 6,947,269 B2 | 9/2005 | Lee | |
| 7,010,613 B2 * | 3/2006 | Connor | 709/236 |
| 7,296,207 B2 * | 11/2007 | Fisher et al. | 714/752 |
| 7,356,596 B2 * | 4/2008 | Ramanujan et al. | 709/227 |
| 7,463,467 B2 | 12/2008 | Lee | |
| 7,577,895 B2 | 8/2009 | Venkataramana | |
| 7,630,863 B2 | 12/2009 | Zweigle et al. | |
| 7,779,267 B2 * | 8/2010 | Chen et al. | 713/185 |
| 7,913,294 B1 * | 3/2011 | Maufer et al. | 726/3 |
| 8,045,589 B2 * | 10/2011 | Kano | 370/477 |
| 8,111,492 B2 | 2/2012 | Lee et al. | |
| 8,154,836 B2 | 4/2012 | Kasztenny et al. | |
| 2004/0123102 A1 | 6/2004 | Gehrmann | |
| 2004/0252837 A1 | 12/2004 | Harvey | |
| 2008/0063344 A1 | 3/2008 | Suzuki et al. | |
| 2008/0123560 A1 | 5/2008 | Nassor | |
| 2010/0315965 A1 * | 12/2010 | Nemeth | 370/252 |

OTHER PUBLICATIONS

GE Multilin, L90 Line Current Differential System UR Series Instruction Manual, Jan. 19, 2010.
SEL-311L-1, -7 Relay Protection and Automation System Instruction Manual, Feb. 5, 2009.
PCT/US2011/040165 Patent Cooperation Treaty International Search Report and Written Opinion of the International Searching Authority, Oct. 26, 2011.

* cited by examiner

*Primary Examiner* — Chuong T Ho
*Assistant Examiner* — Mohamed Kamara
(74) *Attorney, Agent, or Firm* — Jared L. Cherry

(57) ABSTRACT

The present disclosure relates to the transmission of data packets, and to systems and methods for improving the utilization of available bandwidth. In various embodiments, a transmitting device may calculate a first data integrity value based on the payload of a network packet and a static datum (e.g., sender identification information). The first data integrity value is transmitted with the network packet while the static datum is omitted. A receiving device may be configured to replace the omitted static datum upon receipt of the network packet. This static data is pre-configured in the receiving device or communicated using an alternative method. The receiving device may then calculate a second data integrity value based on the received network packet payload and the static datum. The second data integrity value may only match the first data integrity value if the transmitting device and receiving device use the same static datum.

19 Claims, 8 Drawing Sheets

SYSTEMS AND METHODS FOR DATA PACKET TRANSMISSION

TECHNICAL FIELD

This disclosure relates generally to systems and methods for transmitting data packets, and more particularly to systems and methods for reducing the transmission of static data and improving the utilization of available bandwidth for the transmission of variable data.

BRIEF DESCRIPTION OF THE DRAWINGS

Non-limiting and non-exhaustive embodiments of the disclosure are described, including various embodiments of the disclosure with reference to the figures, in which.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Data may be transmitted on a communication network by sending and receiving data encapsulated in network packets. Each network packet may include a header section and a payload section. As the term is used herein, a payload section refers to data to be communicated in a data packet. In contrast, a header section comprises data to route and/or interpret a data packet. For example, a header section may contain information identifying the packet's destination, source, length, version, service, protocol, etc. In various systems, the header section may only be utilized in the transmission process, and the header section may be discarded once the payload has been received by the destination system and verified.

A header section of a network packet may include information identifying a sender of the network packet and a data integrity value that allows a recipient to verify that the network packet arrived unchanged. As the term is used herein, a data integrity value comprises a value generated by any function or algorithm that generates a datum from an arbitrary block of digital data for the purpose of detecting alterations or variations in the data. The integrity of the original data can be checked at any later time by recalculating the data integrity value using the same pre-defined function or algorithm and comparing it with the received data integrity value. If the recalculated data integrity value and the received data integrity value do not match, the data was likely altered between the transmitting and receiving points. Examples of data integrity values include checksums, hash values, cryptographic hash values, data fingerprints, digital signatures, and the like. Each of the foregoing types of data integrity values may be generated by a corresponding function, namely a checksum function, a hash function, a cryptographic hash function, a data fingerprint function, and a digital signature function, respectively.

In certain applications, it may be desirable to configure a device to only accept input from or communicate with an authorized device. A network packet recipient may use sender identification information to verify that a particular network packet originated from an authorized sender. For example, an intelligent electronic device (IED) in an electric power delivery system (such as a transmission or distribution system) may be configured to communicate only with certain authorized IEDs. A recipient IED may disregard network packets that originate from unauthorized or unexpected sender IEDs. A significant premium may be placed on data integrity in a power delivery system, since data corruption may result in undesirable consequences (e.g., interruption of electrical service to end users, failure to trip a faulted line, and the like). Accordingly, a receiving IED may be configured to disregard network packets transmitted by inadvertently cross-connected or unauthorized devices.

Due to electrical noise on data communication media (such as, for example, conductive lines, fiber-optic cables, radio frequency communication media, and the like) or other communication errors, it is possible for one or more bits of data in a bit stream to become corrupt during transmission. In such cases a network packet may be considered corrupt and may not be useable. According to various embodiments disclosed herein, a data integrity value may be utilized to verify that the data encapsulated within a received network packet arrived unchanged. Further, various embodiments disclosed herein may also allow for the verification of a static datum using the data integrity value.

The size of a network packet may depend on the transmission protocol and bandwidth available in a system. For example, in high bandwidth systems (e.g., 1 Mb/s and higher), a network packet may contain thousands of bits; the header may be a small percentage of the overall packet size. However, some protocols and lower bandwidth systems (e.g., transmission systems having a transmission rate lower than 1 Mb/s), may utilize packets limited to only a few hundred bits or fewer. When transmitting packets with relatively small packet sizes, the header may consume a larger percentage of the total available bandwidth in a system then when transmitting packets with larger packet sizes. Accordingly, reducing the amount of data transmitted in a header section may correspondingly increase the bandwidth available to transmit payload data. In various embodiments disclosed herein, a static datum may be omitted from network packets; however, the static datum may be used by both the sending and receiving device in order to generate and verify a data integrity value.

For example, a monitoring IED in a power system may be configured to monitor a power system parameter such as current on each of three phases of a power line and to provide digitally encoded current samples to a control IED every millisecond. The monitoring IED may be configured to report information only to the control IED and to receive instructions only from the control IED. The connection between the monitoring IED and the control IED may be relatively limited in bandwidth (e.g., 64 kb/s). The packet size in such a system may be constrained by the time-sensitive nature of the data. In other words, in order for the monitoring IED to provide a timely data sample to the control IED every millisecond, at least one data packet is transmitted every millisecond. Each data packet may include header information in order to correctly route the packet, identify the sender, and provide a data integrity value. In this system, the identity of the sender remains constant during normal operation. Using the systems and methods described herein, the use of system bandwidth to transmit static data, such as the identity of the sender, may be decreased or avoided, and accordingly a greater portion of the system's bandwidth may be dedicated to transmission of useful data.

According to one embodiment, a sending IED calculates a first data integrity value based on the payload of a network packet and sending IED identification information. The transmitted network packet may include the first data integrity value, but may omit the sending IED's identification information from the network packet. A receiving IED may replace the omitted sending IED identification information with expected identification information preprogrammed into the receiving IED. The receiving IED may then calculate a second data integrity value of the received network packet payload together with the expected identification information. The second data integrity value may only match the first data integrity value included in the network packet if the expected identification information matches the sending IED identification information used to calculate the first data integrity value. Accordingly, a network packet is verified only if the network packet was not corrupted during transmission and the expected identification information matches the sending IED identification information. If an unauthorized or cross-connected IED transmits a network packet to a receiving IED, the network packet will fail verification. As will be discussed in greater detail below, verification failures may be addressed in a variety of ways.

According to an alternative embodiment, a sending IED calculates a data integrity value of a network packet based on a seed value corresponding to sending IED identification information. As the term is used herein, a seed is an initialization value when calculating a data integrity value. Similarly, a receiving IED verifies received network packets using an expected seed value corresponding to expected identification information. Accordingly, only network packets transmitted by one or more sending IEDs authorized to communicate with a particular receiving IED may be verified by the one or more receiving IEDs.

According to various embodiments, by omitting a static datum from transmitted network packets, a larger percentage of each network packet may be used for the payload. Furthermore, by encoding a static datum within a data integrity value included in each network packet, a receiving IED may verify the static datum, together with the payload data.

If a receiving IED receives a threshold number of sequential network packets that fail verification, there may be an inadvertent cross-connection or other error in the system. According to various embodiments, a receiving IED may be configured to report such an error and/or attempt to identify and report the identification information of the cross connected or errant IED.

Reference throughout this specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout this specification are not necessarily all referring to the same embodiment. Furthermore, an "embodiment" may be a system, a method, or a product of a process.

Throughout the remainder of the disclosure specific examples relating to power monitoring and delivery systems are provided. However, it will be readily apparent to one of skill in the art that similar principles may be applied to other applications, including general-purpose communication networks.

The phrases "connected to," "networked," and "in communication with" refer to any form of interaction between two or more entities, including mechanical, electrical, magnetic, and electromagnetic interactions. Two components may be connected to each other even though they are not in direct physical contact with each other and even though there may be intermediary devices between the two components.

Some of the infrastructure that can be used with embodiments disclosed herein is already available, such as: general-purpose computers, computer programming tools and techniques, digital storage media, and communications networks. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer readable storage device such as non-volatile memory, static RAM, dynamic RAM, ROM, CD-ROM, disk, tape, magnetic, optical, flash memory, or other computer-readable storage medium.

As used herein, the term IED may refer to any microprocessor-based device that monitors, controls, automates, and/or protects monitored equipment within the power system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. IEDs may be connected to a network, and communication on the network may be facilitated by networking devices including but not limited to multiplexers, routers, hubs, gateways, firewalls, and switches, each of which may also be considered an IED. The networking devices may use a variety of physical media such as electrical, optical fiber or radio-wave connections. Furthermore, networking and communication devices may be incorporated in an IED or be in communication with an IED. The term IED may be used interchangeably to describe an individual IED or a system comprising multiple IEDs.

Aspects of certain embodiments described herein may be implemented as software modules or components. As used herein, a software module or component may include any type of computer instruction or computer executable code located within a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer readable storage media. In addition, data being tied or rendered together in a database record may be resident in the same computer readable storage medium, or across several computer readable storage media, and may be linked together in fields of a record in a database across a network.

The software modules described herein tangibly embody a program, functions, and/or instructions that are executable by computer(s) to perform tasks as described herein. Suitable software, as applicable, may be readily provided by those of skill in the pertinent art(s) using the teachings presented herein and programming languages and tools, such as XML, Java, Pascal, C++, C, database languages, APIs, SDKs, assembly, firmware, microcode, and/or other languages and tools. Additionally, software, firmware, and hardware may be interchangeably used to implement a given function.

In the following description, numerous details are provided to give a thorough understanding of various embodiments. One skilled in the relevant art will recognize, however, that the embodiments disclosed herein can be practiced without one or more of the specific details, or with other methods, components, materials, etc. In other instances, well-known structures, materials, or operations are not shown or described in detail to avoid obscuring aspects of this disclosure.

Figure 1A:
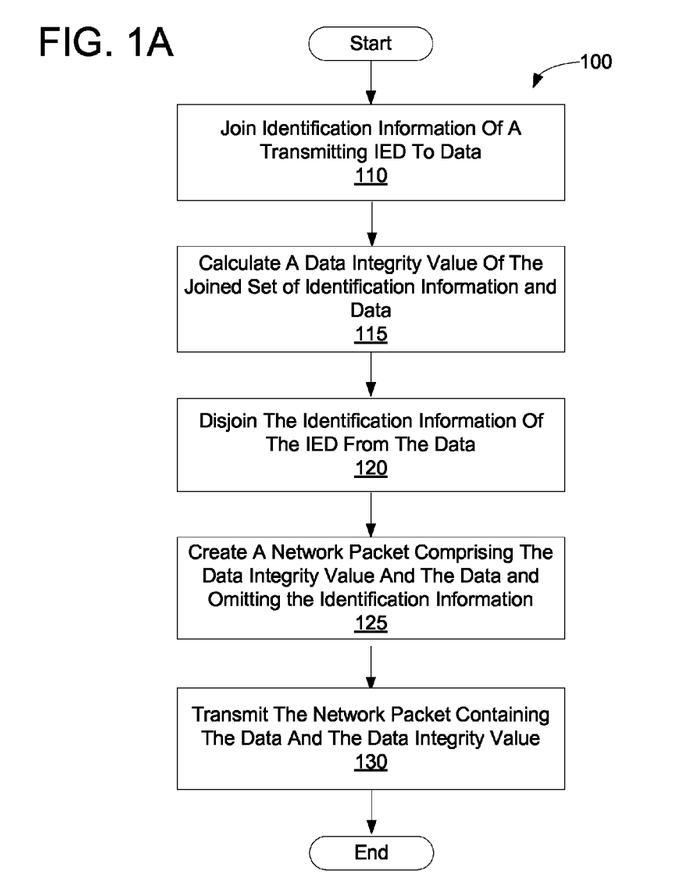
FIG. 1A illustrates a flow chart of a method for preparing and transmitting a network packet that includes a data integrity value that may be utilized to verify a static datum and variable data included in the network packet.

FIG. 1A illustrates a flow chart of a method 100 for transmitting a network packet that includes a data integrity value. The data integrity value may be utilized to verify a static datum and variable data. In connection with FIG. 1A, an example is provided, in which the static datum comprises information identifying a transmitting IED. Information identifying a transmitting IED may include, for example, an IED name, identification number, a firmware/software identification value, and the like. An IED name or identification number may be used to ensure that data from an inadvertently cross-connected device is not used by the receiving end. A firmware/software identification value may be used to ensure that the transmitting and receiving IEDs are compatible, so that the meaning of the transmitted data is correctly understood by the receiving device. For example, a new firmware revision may change a scaling value of a data item. If the transmitting and receiving IEDs having different firmware revisions use different scaling values, the data may not be interpreted or processed correctly. In other words, checking compatibility of firmware revisions may help to prevent misinterpretation of data. In other examples, the static datum may represent another type of datum (e.g., feeder information, an identification of a cryptography key, etc.).

According to the illustrated embodiment, at 110 the transmitting IED may join identification information of the transmitting IED to data to be transmitted, thus creating a joined set of identification information and data. In various embodiments, the identification information may comprise the transmitting IED's user-assigned name, serial number, model number, firmware version, Media Access Control (MAC) address, Internet Protocol (IP) address, and/or combinations of any of the foregoing.

At 115, the IED may then calculate a data integrity value of the joined set of identification information and data. A data integrity value may be obtained using any of a number of available algorithms, including but not limited to, a parity word, any variety of checksum algorithms (e.g., a BSD checksum, a Fletcher's checksum, an Adler checksum), a Cyclic Redundancy Check (CRC), a Bose-Chaudhuri-Hocquienghem (BCH) check, a Longitudinal Redundancy Check (LRC), a Reed-Solomon block code, a Hamming code, and the like.

In various embodiments disclosed herein, verifying the identity of a sender of a data packet may be accomplished even though the packet does not include information explicitly identifying the sender. At 120 the transmitting IED may disjoin the identification information from the data, and at 125, the IED may create a network packet comprising the data integrity value and the data, but it omits the identification information. In one embodiment, the data integrity value is included within the header of the network packet. In other embodiments, the data integrity value may be appended to the end of the data packet. The omission of sender identification information may allow for more bits in each data packet to be allocated for payload data. At 130, the IED transmits the network packet comprising the data and the data integrity value.

According to method 100, the number of bits used for identification information does not reduce the size of the network packet available to transmit variable data (e.g., the payload section) because the identification information is not included in the network packet. A variety of types of data integrity algorithms, such as those referenced above, may be used to produce a fixed-size data integrity value from an arbitrarily large data set. Accordingly, a variety of types of data may be utilized in order to provide identification information and to encode the identification information in a data integrity value.

Figure 1B:
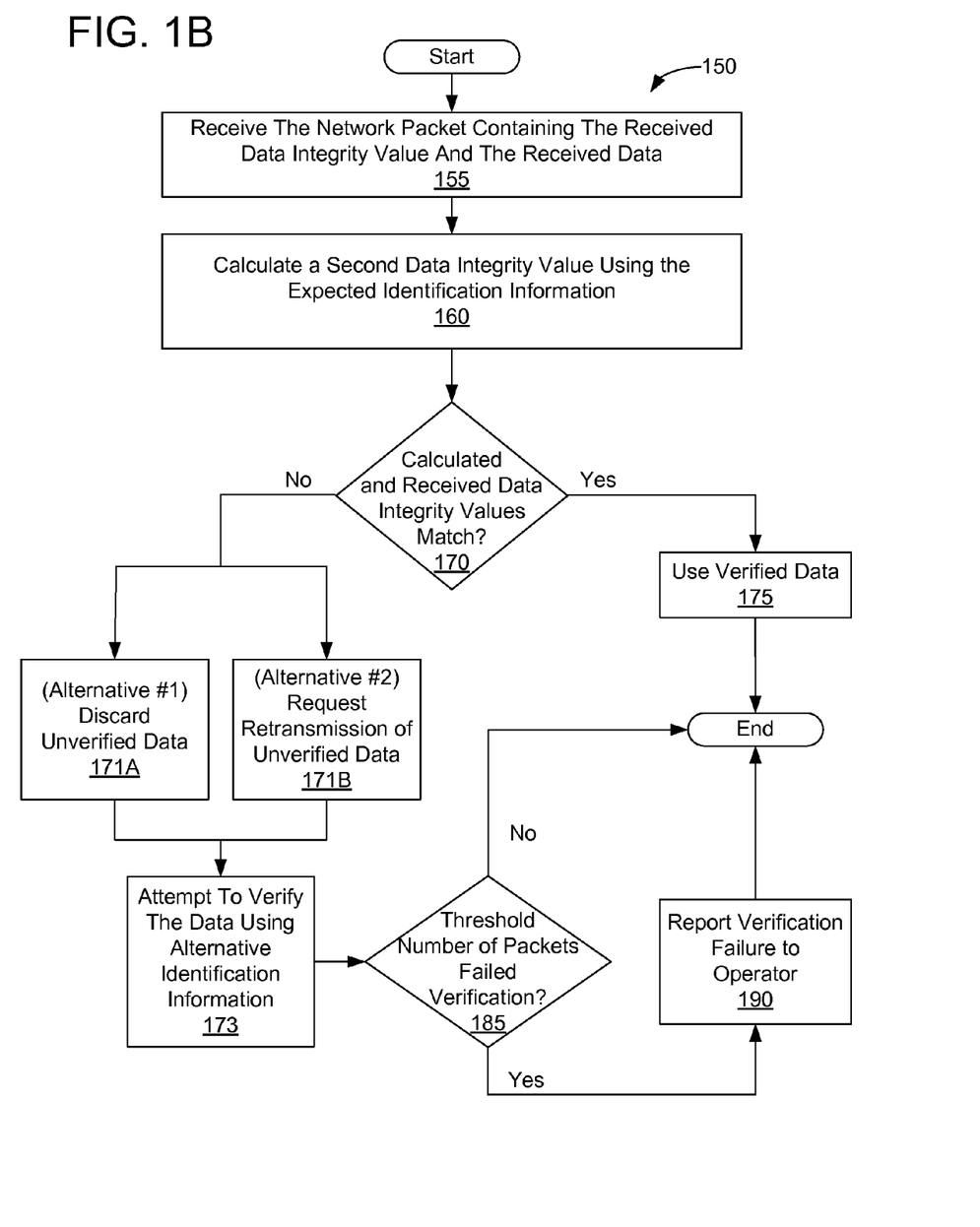
FIG. 1B illustrates a flow chart of a method for receiving a network packet prepared according to the method illustrated in FIG. 1A and verifying the static datum and variable data included in the network packet.

FIG. 1B illustrates a flow chart of a method 150 for receiving a network packet prepared according to the method illustrated in FIG. 1A and verifying the static datum and variable data included in the network packet. At 155, a receiving IED receives the network packet comprising a received data integrity value and received data. At 160, the receiving IED may calculate a second data integrity value using expected identification information and the received data.

As described above, the data integrity value included in the received packet was calculated using the transmitting IED's sender identification information, together with the data to be transmitted. Accordingly, the expected sending IED identification information is joined to the received data, and a second data integrity value of the received data and expected identification information is calculated by the receiving IED. In various embodiments, the expected identification information may be preprogrammed in the receiving IED (i.e., may have been provided prior to receipt of the packet being analyzed), may be transmitted periodically by the transmitting IED, or may be derived by the receiving IED. The expected identification information may correspond to one or more IEDs from which the receiving IED is authorized to receive network packets.

After replacing the previously disjoined sender identification information of the transmitting IED with the expected identification information, the receiving IED may calculate a second data integrity value of the joined data and expected identification information. At 170, the second data integrity value may be compared to the received data integrity value to verify the network packet's data integrity and that the network packet was transmitted by an IED from which the receiving IED expects to receive data. That is, if the expected identification information of the receiving IED matches the sender identification information of the transmitting IED and the data was not corrupted during transmission, the second data integrity value will match the received data integrity value.

At 170, if the received network packet is verified (by determining that the second data integrity value matches the received data integrity value), then the received data can be used by the receiving IED, at 175. If the received data fails verification, the data may be discarded, at 171A, or alternatively, a request for retransmission of the unverified data may be generated, at 171B. In systems in which data is time-sensitive (e.g., an approximately real-time feed of data), receipt of each data packet may not be necessary, and unverified data may be dropped. In other instances, however, receipt of each packet may be necessary (e.g., the transmission of a digital file across a data network), and thus retransmission of the data may be requested.

In certain embodiments, at 173, where verification of data has failed, the system may attempt to verify the data using alternative identification data. For example, a receiving IED may have access to identification information of a plurality of transmitting IEDs. Accordingly, the receiving IED may calculate alternative data integrity values using identification data of the known plurality of transmitting IEDs. If the number of transmitting IEDs is relatively small, a receiving IED may be able to identify the source of the data. In certain embodiments, an alert may notify an operator of a configuration change and/or configuration error that is causing network packets to be misrouted. The identification of the inadvertently connected source of data may be displayed when generating the alert. Determining the source of the data may simplify and accelerate troubleshooting of the problem.

The receipt of a threshold number of packets that have failed verification may indicate a persistent change, such as a change in a system's configuration. Accordingly, at 185, a determination may be made as to whether a threshold number of packets have failed verification. For example, if 100 sequential packets fail verification, an unexpected configuration change may have occurred, or a substantial source of noise may have been introduced. In either case, the verification failure may be reported to a system operator at 190 and end.

Figure 2A:
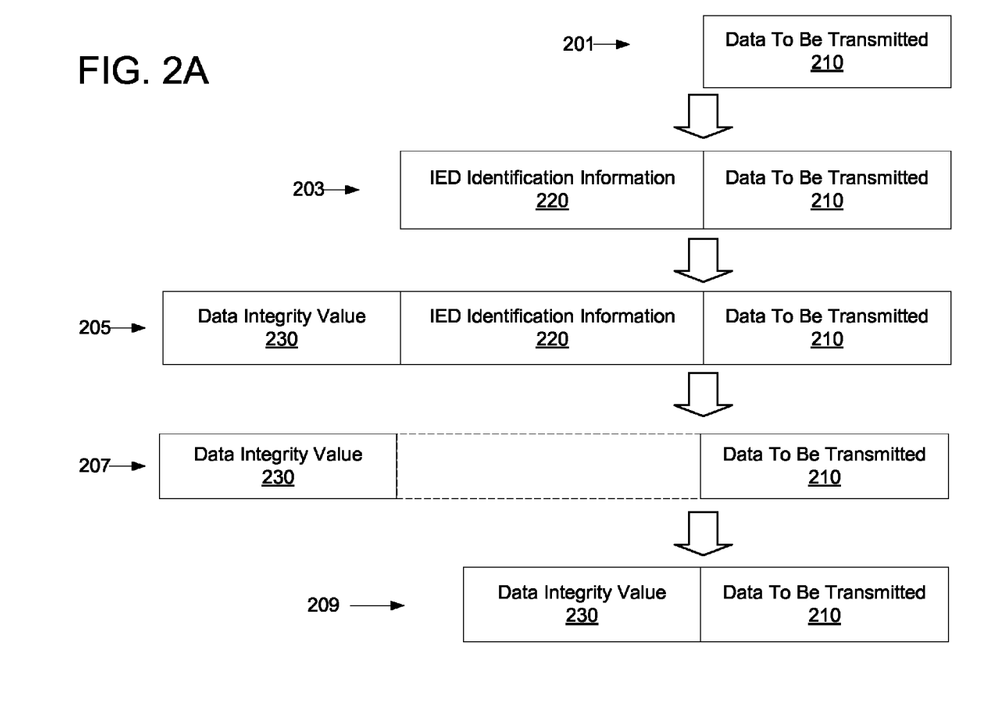
FIG. 2A illustrates a conceptual representation of one embodiment of the preparation of a network packet for transmission.

FIG. 2A illustrates a conceptual representation of the preparation of a network packet for transmission, according to one embodiment. At 201, a transmitting IED prepares data to be transmitted 210. As described above, the network packet to be transmitted may include a payload section and a header section. The header section may comprise one or more static pieces of data. In the illustrated example, the static datum comprises IED identification information 220 of the transmitting IED. A variety of types of identification information may be utilized. For example, various embodiments may utilize one or more of the following: a user-assigned name, a serial number, a model number, a firmware version, a Media Access Control (MAC) address, an Internet Protocol (IP) address, combinations of the above, and the like. In typical operation, each of these values may remain static.

At 203, the transmitting IED may join its identification information 220 to data to be transmitted 210. According to various embodiments, IED identification information 220 may be joined to the beginning, inserted within, or joined at the end of the data to be transmitted 210. Certain data transmission algorithms insert the data integrity value at or near the end of the packet. Inserting the data integrity value at the end of the packet may allow for calculation of the data integrity value approximately in real time, and as such, the data integrity value may not be known until the entire packet is formed. At 205, the transmitting IED may calculate data integrity value 230 based on IED identification information 220 and data to be transmitted 210. As discussed above, a variety of types of algorithms may be utilized to generate an appropriate data integrity value, based upon the transmitting IED identification information 220 and data to be transmitted 210.

At 207, IED identification information 220 (e.g., the static datum) may be disjoined or otherwise removed from the network packet. At 209, the transmitting IED may transmit the network packet, including data integrity value 230 and data to be transmitted 210, but omitting transmitting IED identification information 220. According to various embodiments, the transmitting IED identification information 220 may be provided to a receiving IED prior to the transmission of a network packet. This information may be preprogrammed into the receiving IED, or in other embodiments, this information may be sent from the transmitting IED to a receiving IED according to a schedule.

By omitting the transmitting IED identification information 220 from each network packet, a greater proportion of the network packet may be allocated to the payload. Further, the data integrity value may be utilized to provide an indication of data corruption, as well as an indication of the identity of the transmitting IED. In certain embodiments, a receiving IED may be configured to differentiate between a verification failure caused by a transmission error and a verification failure caused by receiving a data packet from an unexpected transmitting IED. In systems in which the receiving IED is able to calculate alternative data integrity values using alternative transmitting IED identification information, the system may identify data packets received from an unexpected transmitting IED. In this way, if a transmitting IED is cross-connected or otherwise sends an unauthorized network packet to a receiving IED, the unauthorized network packet may fail verification. To the extent that the receiving IED is able to verify the network packet using alternative transmitting IED identification information, the verification failure is caused by receiving a data packet from an unexpected source. To the extent that the receiving IED cannot verify the packet using alternative transmitting IED identification information, the system may conclude that the verification failure was caused by a transmission error.

Figure 2B:
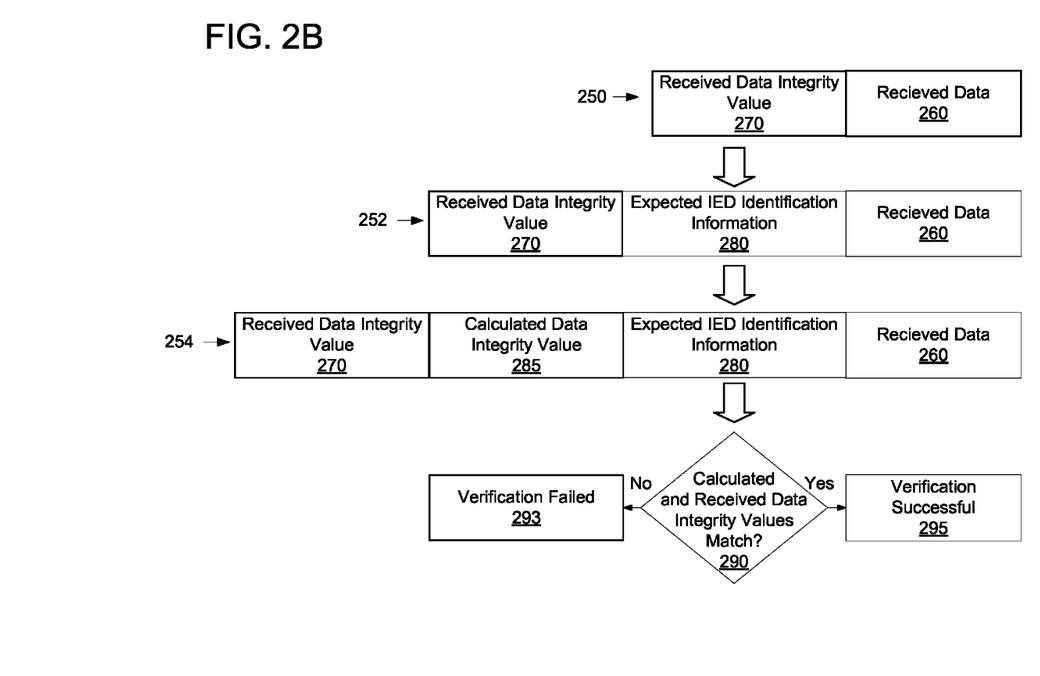
FIG. 2B illustrates a conceptual representation of the processing of a network packet that was prepared and transmitted according to the method of FIG. 2A.

FIG. 2B illustrates a conceptual representation of the processing of a network packet that was prepared and transmitted according to the method of FIG. 2A. At 250, a receiving IED receives a network packet from a transmitting IED. The received network packet comprises a received data integrity value 270 and received data 260. At 252, the receiving IED may join expected IED identification information 280 to received data 260. At 254, the receiving IED may calculate a second data integrity value 285, based on the expected IED identification information 280 and the received data 260.

If expected IED identification information 280 corresponds to the IED identification information omitted from the packet prepared according to the method of FIG. 2A, then the calculated data integrity value 285 will match received data integrity value 270. At 290, calculated data integrity value 285 may be compared with received data integrity value 270. If calculated data integrity value 285 matches received data integrity value 270, verification of the received network packet is successful 295. If, on the other hand, calculated data integrity value 285 does not match received data integrity value 270, verification fails 293. A network packet that fails verification may signify that the network packet was corrupted during transmission and/or that the transmitting IED was not an IED from which the receiving IED expected to receive a network packet. If the transmitting IED was not an IED from which the receiving IED expected to receive a network packet, the IED may report a configuration error in the communications network.

Figure 3A:
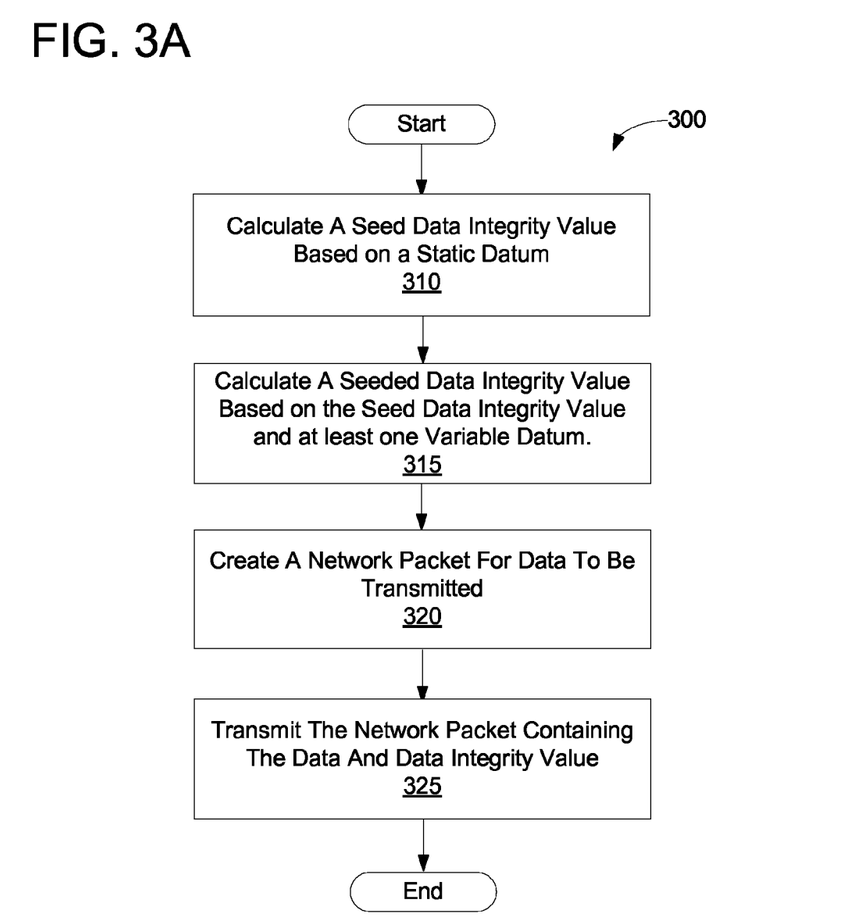
FIG. 3A illustrates a flow diagram of a method, in which an IED transmits a network packet including a data integrity value based on a seed value corresponding to identification information of the transmitting IED.

FIG. 3A illustrates a flow diagram of a method 300, in which an IED transmits a network packet including a data integrity value based on a seed value corresponding to identification information of the transmitting IED. A receiving IED may be configured with the same seed value in order to use the data integrity value to verify a received network packet. Accordingly, the transmitting IED may omit identification information from the network packet, while still allowing a receiving IED to verify that the network packet was transmitted by an expected IED.

In the embodiment illustrated in FIG. 3A, a seeded data integrity value may be calculated using a static datum 310. In one example, the static datum may comprise a transmitting IED's identification information. The seed data integrity value may be calculated using any number of data integrity algorithms, including those listed above.

At 315, a seeded data integrity value may be calculated based on the seed data integrity value and at least one variable datum. In other words, the calculations utilized to generate the seed data integrity value need not be recalculated. Rather a data integrity value algorithm may begin with the seed data integrity value as an initial value, and only perform calculations in order to modify the seed data integrity value based on the variable datum.

At 320, the transmitting IED creates a network packet. The network packet may include a header section, which may comprise the seeded data integrity value, and a payload section, which may contain the variable data to be transmitted. According to various embodiments, the header section may also comprise information used to route the network packet to the intended recipient. At 325, the IED transmits the network packet containing the data and the data integrity value.

Figure 3B:
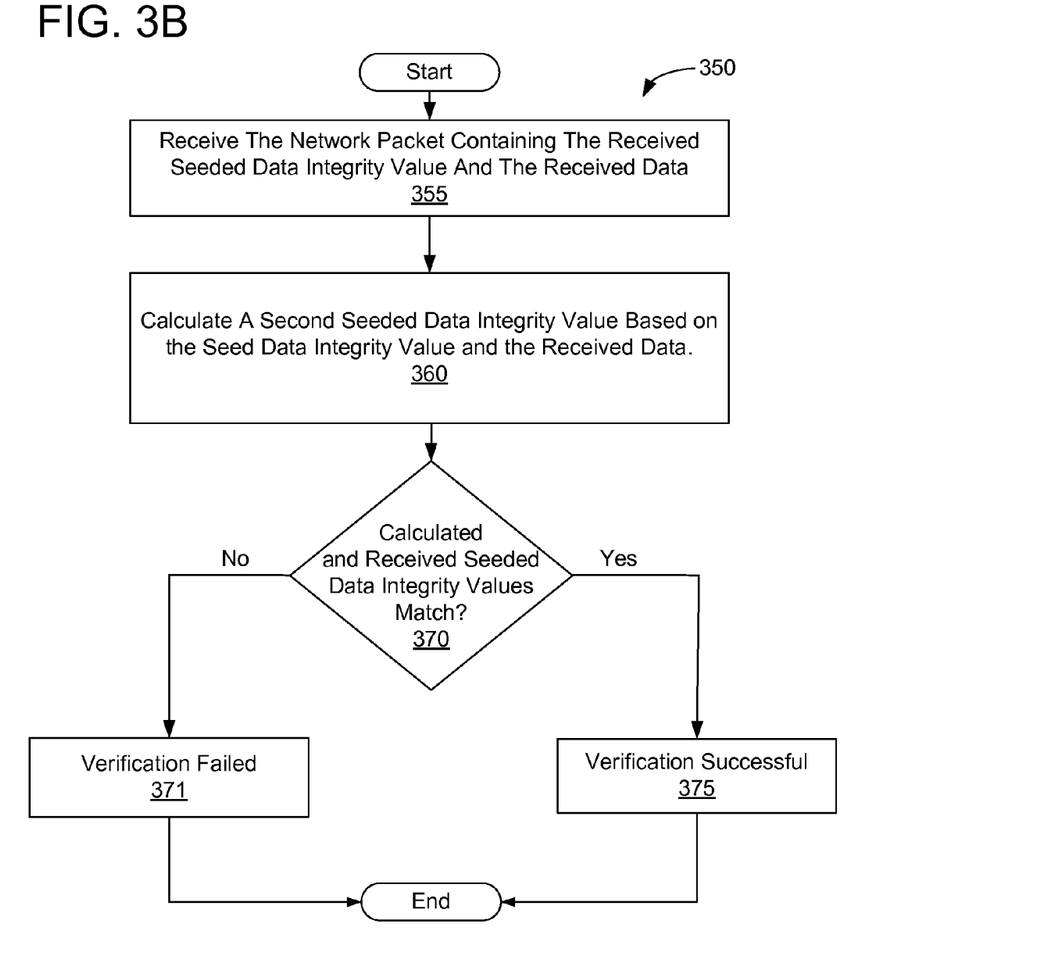
FIG. 3B illustrates a flow diagram of a method 350, in which a receiving IED receives and verifies a network packet transmitted according to the method illustrated in FIG. 3A.

FIG. 3B illustrates a flow diagram of a method 350, in which a receiving IED receives and verifies a network packet transmitted according to the method illustrated in FIG. 3A. The receiving IED may receive the seed data integrity value at some point prior to transmission of a network packet. At 355, the receiving IED receives the network packet containing the received seeded data integrity value and the received data. At 360, the receiving IED calculates a second seeded data integrity value using the seed data integrity value and the received data. The preconfigured seed value may correspond to the seed value used by the transmitting IED. According to various embodiments, a receiving IED may be preconfigured with multiple seed values, each corresponding to the identification information of IEDs from which the receiving IED expects to receive network packets. Accordingly, the receiving IED may need to calculate a data integrity value using each of its preconfigured data integrity values to determine which, if any, authorized IED transmitted the network packet.

At 370, the calculated seeded data integrity value and the received seeded data integrity value may be compared. If the calculated seeded data integrity value and the received seeded data integrity value match, the verification is successful 375. If the calculated seeded data integrity value and the received seeded data integrity value do not match, the verification fails 371. In one embodiment, when verification fails 371, the receiving IED may attempt to verify the integrity of the network packet using alternative seed data integrity values.

Figure 4:
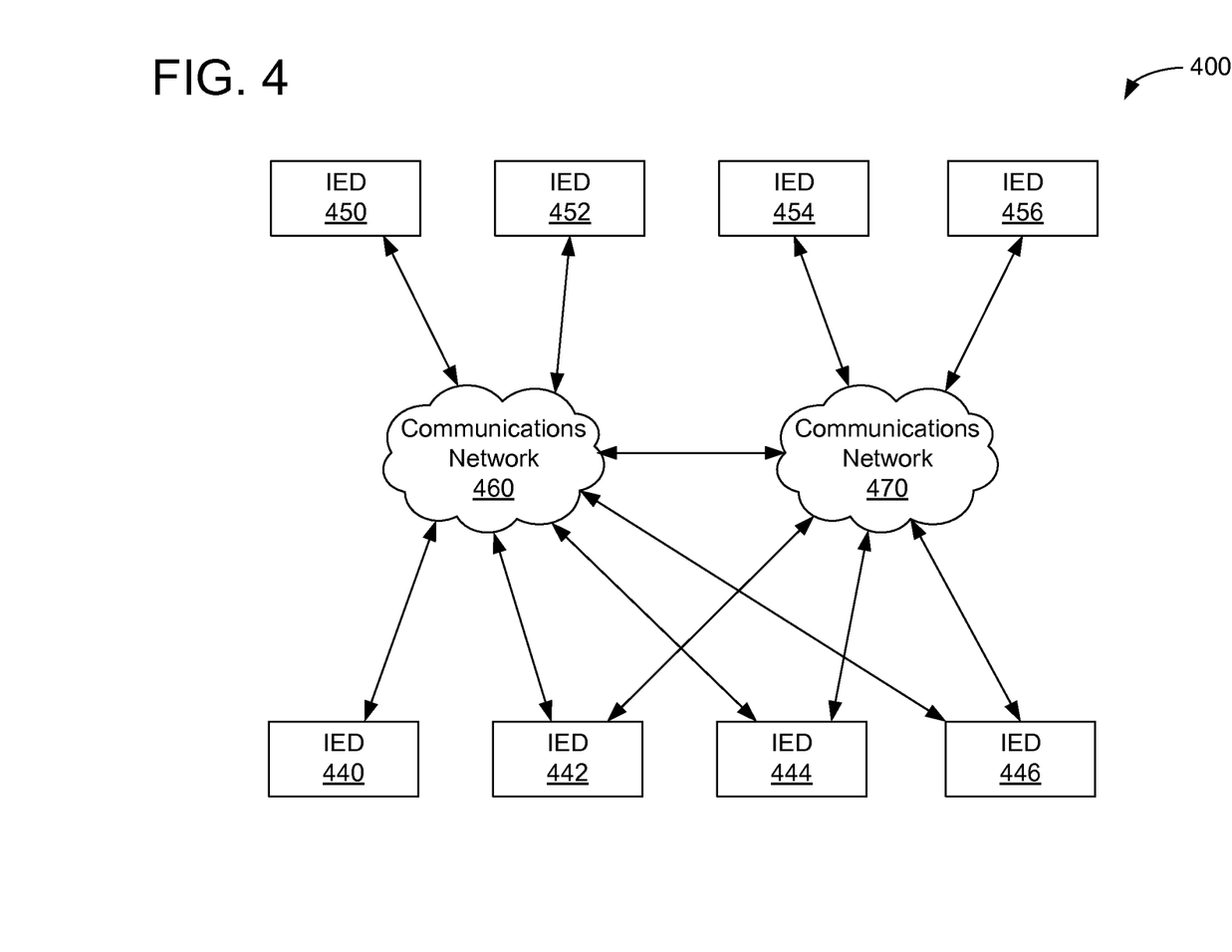
FIG. 4 illustrates a block diagram of one embodiment in which several IEDs are communicatively coupled via a communications network.

FIG. 4 illustrates a block diagram of a communications network 400 comprising IEDs 440-456 and communications networks 460 and 470. According to various embodiments, communications network 400 may include any number of IEDs and/or communications networks. As illustrated in FIG. 4, IEDs 440-456 are connected to one or more communications networks 460 and/or 470. For example, IED 450 may communicate with IED 452 through communications network 460, and with IED 446 through communications network 460 and communications network 470. According to alternative embodiments, some IEDs may be in direct communication with other IEDs.

According to one embodiment, IEDs 440-456 are part of an electric power delivery system. In this embodiment, it may be desirable to configure certain IEDs to communicate only with other specified IEDs. For example, IEDs 440-446 may be control IEDs, each of which makes decisions based on monitoring IEDs 450-456. For example, IED 446 may be configured to control a power system relay in response to data received from IED 456. IED 446 may be configured to disregard network packets transmitted by other IEDs. Thus, if IED 454 transmits a network packet to IED 446, it should be disregarded.

According to one embodiment, to ensure that IED 446 only responds to data transmitted by IED 456, each network packet transmitted by IED 456 may include sender identification information in the header of the network packet. Receiving IED 446, may then confirm that IED 456 transmitted the network packet by reviewing the sender identification information. IED 446 may use a data integrity value contained within the transmitted network packet to verify that the network packet arrived without data corruption. The transmission of identification information may reduce the amount of useful data that can be transmitted.

According to another embodiment, a transmitting IED omits the sender identification information from the network packet, and instead generates a data integrity value using the transmitting IED's identification information, together with the data to be transmitted. In this manner, a receiving IED may verify a received network packet's data integrity by calculating a matching data integrity value using expected identification information, so long as the expected identification information is the same as the sender identification information.

Returning to the example described above, IED 456 transmits a network packet to IED 446 that includes a data integrity value based on the contents of the network packet and the sender identification information of IED 456. However, IED 456 may not transmit the sender identification information of IED 456. IED 446 may receive the transmitted network packet and calculate a data integrity value based on the contents of the network packet and expected identification information. The expected identification information may be preprogrammed in IED 446 and may correspond to the sender identification of IED 456. Thus, the data integrity value calculated by IED 446 will match the data integrity value included in the network packet transmitted by IED 456.

The network packet may fail verification if the data is corrupted during transmission or if the expected identification information does not match the sender identification information of IED 456. For example, IED 454 transmits a network packet to IED 446 including a data integrity value based on the contents of the network packet and the sender identification information of IED 454. IED 446 may be authorized to only receive network packets from IED 456. IED 446 may calculate a data integrity value of the received network packet based on expected identification information corresponding to IED 456. The data integrity value calculated by IED 446 may be different than the data integrity value transmitted by IED 454 because the sender identification information of IED 454 does not match the expected identification information of IED 446. The network packet may fail verification and be disregarded by IED 446. According to one example, only those network packets transmitted by IEDs whose sender identification information corresponds to a receiving IEDs expected identification information are verified by the receiving IED.

Figure 5:
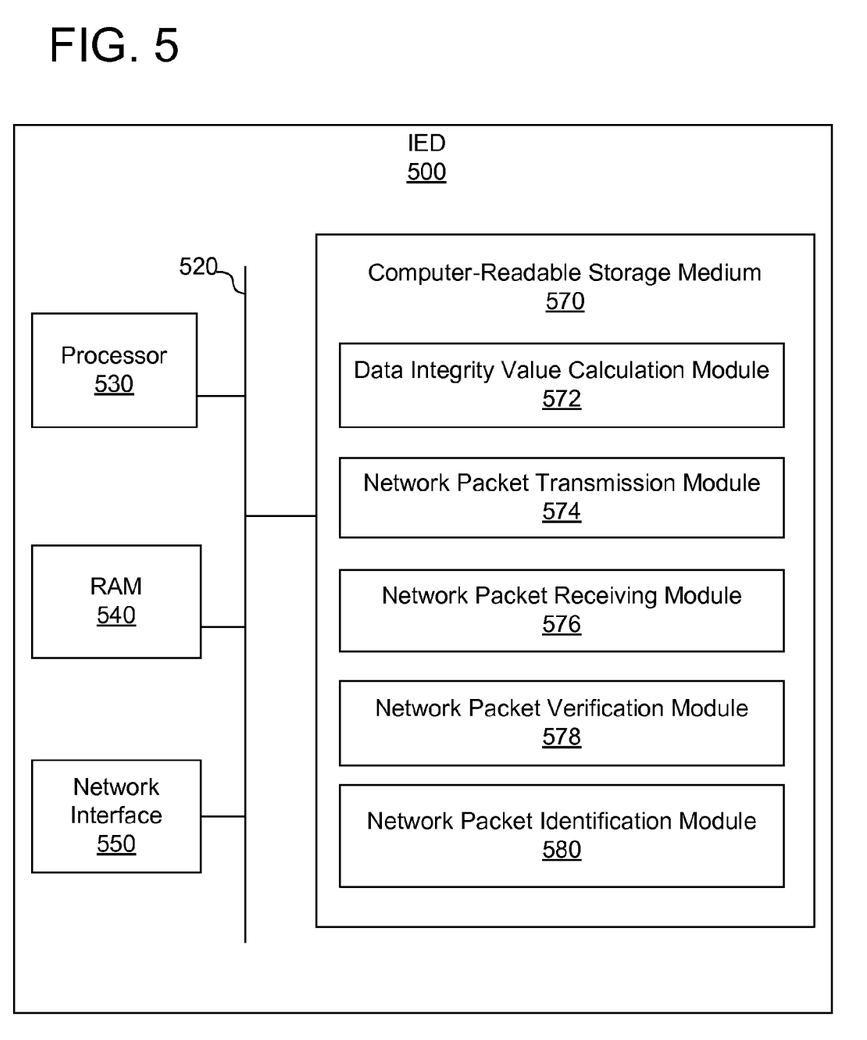
FIG. 5 is a functional block diagram of an IED that is configured to transmit, receive, and/or verify a static datum and a variable datum based on a data verification value.

FIG. 5 is a functional block diagram of an IED 500 that is configured to transmit, receive, and/or verify a static datum and a variable datum based on a data verification value. IED 500 includes a processor 530, a Random Access Memory (RAM) 540, and a network interface 550. A data bus 520 interconnects these components and also connects these components to a computer-readable storage medium 570. Processor 530 may be embodied as a general-purpose processor, an application specific processor, a microcontroller, a digital signal processor, a field-programmable logic array, or other device known in the art. Processor 530 performs logical and arithmetic operations based on program code stored within computer-readable storage medium 570. Computer-readable storage medium 570 may comprise various modules executable on processor 530. According to various embodiments, processor 530, RAM 540, network interface 550, bus 520, and computer-readable storage medium 570 may comprise any number of hardware, software, firmware and/or similar components, as may be appreciated by one of skill in the art. Computer-readable storage medium 570 may include one or more modules 572-580.

According to various embodiments, modules 572-580 may be omitted and/or additional modules may be included. IED 500 may include a data integrity value calculation module 572 configured to calculate a data integrity value to be transmitted in a network packet. Furthermore, the data integrity value may be calculated based on the contents of the network packet together with identification information of IED 500. Alternatively, the data integrity value may be calculated on the contents of the network packet using a seed value corresponding to sender identification information of IED 500.

IED 500 may include network packet transmission module 574 configured to interface with network interface 550 to transmit network packets. IED 500 may further include network packet receiving module 576 configured to interface with network interface 550 to receive network packets. IED 500 may also include network packet verification module 578 configured to verify that received network packets were transmitted by IEDs from which IED 500 expects to receive data.

According to one embodiment network packet verification module 578 calculates a data integrity value based on at least a portion of a received network packet together with expected identification information preprogrammed in IED 500. According to one embodiment, if the value returned from the data integrity value calculated by IED 500 matches the data integrity value transmitted in the received network packet, then both the sender of the packet and the data contained in the packet are verified. According to an alternative embodiment, IED 500 calculates a data integrity value based on at least a portion of a received network packet using a seed value corresponding to expected identification information. Again, if the data integrity value calculated by IED 500 matches the data integrity value transmitted with the network packet then the network packet is verified. If the data integrity values do not match, then the network packet may fail verification.

According to one embodiment, IED 500 further includes network packet identification module 580 configured to identify the sender of a threshold number of sequential network packets that fail verification. According to one embodiment, if a threshold number of network packets fail verification, then network packet identification module 580 may report an error. Additionally, network packet identification module 580 may attempt to verify the network packet using alternative seed values and/or expected identification information. IED 500 may still consider network packets verified using alternative identification information by network packet identification module 580 to be unverified; however, IED 500 may be able to report the identity of an IED transmitting unauthorized or cross-connected network packets.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed:

1. A method of transmitting data in a data network, the method comprising:

a sending intelligent electronic device (IED) calculating a first data integrity value based on a sending IED identification and a variable datum;

the sending IED and a receiving IED in electrical communication using the data network, the sending IED forming a network packet comprising the first data integrity value and the variable datum, wherein the first data integrity value is calculated based on the sending IED identification and the variable datum, and, the sending IED omits the sending IED identification from the network packet;

the sending IED transmitting the network packet;

the receiving IED receiving the network packet comprising the first data integrity value and the variable datum;

the receiving IED calculating a second data integrity value based on the sending IED identification and the received variable datum; and the receiving IED verifying the network packet by comparing the first data integrity value and the second data integrity value.

2. The method of claim 1, wherein the sending IED identification comprises one selected from the group consisting of: user-assigned name, a serial number, a model number, a firmware version, a media access control address, and an Internet Protocol address and combinations thereof.

3. The method of claim 1, wherein the sending IED identification comprises a seeded data integrity value, the seeded data integrity value comprising an output of a data integrity algorithm.

4. The method of claim 3, wherein an input of the data integrity algorithm comprises identification information of the sending IED.

5. The method of claim 1, wherein the variable datum represents at least one characteristic of an electric power delivery system.

6. The method of claim 1, further comprising communicating the sending IED identification to the receiving IED prior to the sending IED transmitting the network packet.

7. The method of claim 1, further comprising configuring the receiving IED using the sending IED identification prior to the sending IED transmitting the network packet.

8. The method of claim 1, further comprising periodically transmitting the sending IED identification to the second IED according to an established schedule.

9. The method of claim 1, further comprising determining that the first data integrity value differs from the second data integrity value.

10. The method of claim 1, further comprising:
the receiving IED receiving a threshold number of sequential network packets, each of which comprises a data integrity value and variable data;
the receiving IED failing to verify any of the threshold number of sequential network packets;
the receiving IED reporting that a threshold number of sequential network packets failed verification.

11. The method of claim 10, further comprising,
the receiving IED attempting to verify each of the threshold number of sequential network packets using alternative identification information;
wherein the alternative identification information corresponds to a third IED.

12. The method of claim 1, wherein the data integrity value comprises one of a parity word, a BSD checksum, a Fletcher's checksum, an Adler checksum, a Cyclic Redundancy Check, a Bose-Chaudhuri-Hocquienghem check, a Longitudinal Redundancy Check, a Reed-Solomon block code, and a Hamming code.

13. A system to transmit encoded identification information in a network packet, comprising:
a sending Intelligent Electronic Device (IED), comprising:
a first network interface to communicate with other networked devices;
a first processor in communication with the first network interface;
a first non-transitory computer-readable storage medium in electrical communication with the processor and comprising computer instructions executable on the first processor, the first non-transitory computer-readable storage medium comprising:
a first data integrity value calculation module to calculate a first data integrity value based on identification information of the sending IED and a variable datum;
a first network packet transmission module to transmit the network packet, wherein
the network packet comprises the first data integrity value and the variable datum and
the first network packet transmission module omits the identification information of the sending IED from the network packet;
a second receiving IED, comprising:
a second network interface to communicate with the sending IED;
a second processor in communication with the second network interface;
a second non-transitory computer-readable storage medium in electrical communication with the processor and comprising computer instructions executable on the second processor, the second non-transitory computer-readable storage medium comprising:
identification information of the sending IED;
a network packet verification module to calculate a second data integrity value based on the received variable datum and the identification information of the sending IED;
wherein the network packet verification module compares the first data integrity value and the second data integrity value to verify that the network packet originated from the sending IED.

14. The system of claim 13, wherein the identification information of the sending IED comprises information selected from the group consisting of a user-assigned name, a serial number, a model number, a firmware version, a media access control address, and an Internet Protocol address.

15. The system of claim 13, wherein the variable datum represents at least one characteristic of an electric power delivery system.

16. The method of claim 1, further comprising configuring the sending IED to transmit the variable datum only to the receiving IED.

17. The method of claim 16, further comprising:
the receiving IED verifying an identity of the sending IED based on the second data integrity value.

18. The method of claim 1, wherein omitting the sending IED identification comprises omitting all identifying information identifying the sending IED from the network packet.

19. The method of claim 1, further comprising:
the receiving IED joining the sending IED identification with the network packet, and
wherein the second data integrity value is calculated based on the network packet joined with the sending IED identification.

* * * * *